(12) United States Patent
Toyoda et al.

(10) Patent No.: US 10,008,737 B2
(45) Date of Patent: Jun. 26, 2018

(54) COMPOSITION FOR LITHIUM ION SECONDARY BATTERY POROUS MEMBRANE, POROUS MEMBRANE FOR LITHIUM ION SECONDARY BATTERY, AND LITHIUM ION SECONDARY BATTERY

(71) Applicant: ZEON CORPORATION, Chiyoda-ku, Tokyo (JP)

(72) Inventors: Yujiro Toyoda, Tokyo (JP); Hiromi Takamatsu, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days. days.

(21) Appl. No.: 15/504,103

(22) PCT Filed: Sep. 17, 2015

(86) PCT No.: PCT/JP2015/004769
§ 371 (c)(1),
(2) Date: Feb. 15, 2017

(87) PCT Pub. No.: WO2016/051713
PCT Pub. Date: Apr. 7, 2016

(65) Prior Publication Data
US 2017/0279152 A1    Sep. 28, 2017

(30) Foreign Application Priority Data
Sep. 30, 2014 (JP) ................... 2014-201390

(51) Int. Cl.
| | |
|---|---|
| *H01M 10/052* | (2010.01) |
| *H01M 10/0525* | (2010.01) |
| *H01M 4/62* | (2006.01) |
| *H01M 4/13* | (2010.01) |
| *H01M 4/80* | (2006.01) |
| *H01M 4/76* | (2006.01) |
| *H01M 2/16* | (2006.01) |

(52) U.S. Cl.
CPC ......... *H01M 10/0525* (2013.01); *H01M 2/16* (2013.01); *H01M 4/13* (2013.01); *H01M 4/622* (2013.01); *H01M 4/762* (2013.01); *H01M 4/80* (2013.01)

(58) Field of Classification Search
CPC .................. H01M 10/052; H01M 10/0525
See application file for complete search history.

(56) References Cited

U.S. PATENT DOCUMENTS

| | | |
|---|---|---|
| 3,737,482 A | 6/1973 | Kelly et al. |
| 4,959,408 A | 9/1990 | Grant |
| 2011/0159362 A1 | 6/2011 | Wakizaki et al. |
| 2013/0316235 A1* | 11/2013 | Yasuda ................... H01M 4/02 429/211 |

FOREIGN PATENT DOCUMENTS

| | | | |
|---|---|---|---|
| JP | 2011165430 A | 8/2011 | |
| JP | WO 2012111564 A1 * | 8/2012 | ............. H01M 4/02 |
| JP | 2013145763 A | 7/2013 | |
| WO | 2010024328 A1 | 3/2010 | |

OTHER PUBLICATIONS

Charles M. Hansen, "Hansen Solubility Parameters: A User's Handbook, Second Edition", CRC Press, Inc., 2007.
Apr. 4, 2017, International Preliminary Report on Patentability issued in the International Patent Application No. PCT/JP2015/004769.
Feb. 26, 2018, the Extended European Search Report issued by the European Patent Office in the corresponding European Patent Application No. 15846510.4.

* cited by examiner

*Primary Examiner* — Olatunji Godo
(74) *Attorney, Agent, or Firm* — Kenja IP Law PC

(57) ABSTRACT

Provided is a technique for capturing transition metal ions, such as cobalt ions, in a secondary battery that elute from a positive electrode active material and for preventing deposition of transition metal at a negative electrode. A composition for a lithium ion secondary battery porous membrane that contains non-conductive particles and a binding material is provided. The binding material includes a polymer A including an aliphatic conjugated diene monomer unit in a proportion of greater than 85 mass % and a polymer B including a (meth)acrylic acid ester monomer unit in a proportion of at least 60 mass %. A mass basis ratio of content of the polymer A relative to content of the polymer B is at least 0.2 and no greater than 9.0.

5 Claims, No Drawings

COMPOSITION FOR LITHIUM ION SECONDARY BATTERY POROUS MEMBRANE, POROUS MEMBRANE FOR LITHIUM ION SECONDARY BATTERY, AND LITHIUM ION SECONDARY BATTERY

TECHNICAL FIELD

The present disclosure relates to a composition for a lithium ion secondary battery porous membrane, a porous membrane for a lithium ion secondary battery, and a lithium ion secondary battery.

BACKGROUND

Lithium ion secondary batteries have characteristics such as compact size, light weight, high energy-density, and the ability to be repeatedly charged and discharged, and are used in a wide variety of applications. A lithium ion secondary battery generally includes battery components such as a positive electrode, a negative electrode, and a separator that isolates the positive electrode and the negative electrode from one another and prevents short circuiting between the positive and negative electrodes.

In recent years, battery components provided with a porous membrane containing non-conductive particles and a binding material have been used in lithium ion secondary batteries as battery components having improved heat resistance or strength. Specific examples of such battery components include an electrode obtained by forming a porous membrane on an electrode mixed material layer that is provided on a current collector, a separator obtained by forming a porous membrane on a separator substrate, and a separator composed solely by a porous membrane. In order to further improve the performance of lithium ion secondary batteries in which porous membrane-containing battery components such as described above are used, much activity is being focused toward the improvement of porous membranes (for example, refer to PTL 1 and 2).

In one specific example, PTL 1 proposes a technique for improving binding of a porous membrane while inhibiting aggregation of a binding material by using, as the binding material, a carboxy-modified diene-based polymer including from 5 mass % to 85 mass % of an aliphatic conjugated diene monomer unit.

In another example, PTL 2 proposes a technique for improving flexibility of a porous membrane and cycle characteristics of a secondary battery by using a styrene resin and a polymer having a glass transition temperature of no higher than 15° C. as a binding material.

CITATION LIST

Patent Literature

PTL 1: JP 2011-165430 A
PTL 2: WO 2010/024328 A1

SUMMARY

Technical Problem

In recent years, a positive electrode mixed material layer containing a transition metal-containing positive electrode active material (for example, $LiCoO_2$) may be used as an electrode mixed material layer (positive electrode mixed material layer) of a positive electrode in a lithium ion secondary battery for reasons such as increasing battery capacity. However, in a lithium ion secondary battery in which a transition metal-containing positive electrode active material is used, a side-reaction or the like accompanying use of the lithium ion secondary battery may cause the transition metal in the positive electrode active material (for example, cobalt in the case of $LiCoO_2$) to elute into an electrolysis solution in the form of transition metal ions. Moreover, the transition metal that elutes into the electrolysis solution from the positive electrode may deposit on a negative electrode, leading to deterioration of secondary battery life characteristics, such as expansion resistance and cycle characteristics.

With regards to conventional lithium ion secondary batteries, although there has been much attention focused on techniques for improving secondary battery performance by improving physical properties of porous membranes and other battery components themselves, there has been insufficient investigation into the problem of transition metal elution described above. Consequently, there is demand for the provision of a technique that with respect to a lithium ion secondary battery in which a transition metal-containing positive electrode active material is used, enables the capture of transition metal ions, such as cobalt ions, in the secondary battery that have eluted from the positive electrode active material, before these transition metal ions migrate into proximity of the negative electrode, and prevents transition metal deposition at the negative electrode.

Solution to Problem

The inventors conducted diligent investigation with the aim of providing a technique for capturing transition metal ions, such as cobalt ions, that elute into an electrolysis solution from a positive electrode active material. The inventors conceived an idea of providing a porous membrane of a battery component with transition metal ion capturing functionality in order to capture transition metal ions, such as cobalt ions, in a secondary battery that elute into an electrolysis solution from a positive electrode active material of a positive electrode mixed material layer. The inventors conducted further investigation and discovered that a polymer including an aliphatic conjugated diene monomer unit in a specific proportion displays high transition metal capturing ability and that in a situation in which a polymer A including an aliphatic conjugated diene monomer unit in a specific proportion and a polymer B including a (meth)acrylic acid ester monomer unit in a specific proportion are used together in a specific ratio as a binding material of a porous membrane, the porous membrane can be provided with even higher transition metal capturing ability, while also ensuring peel strength of the porous membrane compared to a situation in which the polymer A is used individually.

In the present disclosure, "(meth)acryl" is used to indicate "acryl" and/or "methacryl".

Moreover, the phrase "includes a monomer unit" as used in the present disclosure means that "a polymer obtained with the monomer includes a structural unit derived from the monomer".

Specifically, the present disclosure aims to advantageously solve the problems described above by disclosing a composition for a lithium ion secondary battery porous membrane comprising non-conductive particles and a binding material, wherein the binding material includes a polymer A including an aliphatic conjugated diene monomer unit in a proportion of greater than 85 mass % and a polymer B including a (meth)acrylic acid ester monomer unit in a proportion of at least 60 mass %, and a mass basis ratio of content of the polymer A relative to content of the polymer B is at least 0.2 and no greater than 9.0. When a composition containing a binding material that includes, in a specific ratio, a polymer A including an aliphatic conjugated diene monomer unit in a specific proportion and a polymer B including a (meth)acrylic acid ester monomer unit in a specific proportion as described above is used to form a porous membrane, a porous membrane having excellent capturing ability with respect to transition metal ions can be obtained, while also ensuring performance in terms of peel strength and so forth.

In the presently disclosed composition for a lithium ion secondary battery porous membrane, the polymer A and the polymer B are preferably contained in a total amount of at least 2 parts by mass and no greater than 50 parts by mass per 100 parts by mass of the non-conductive particles. A total amount of the polymer A and the polymer B within the aforementioned range enables further improvement of peel strength and transition metal capturing ability of the porous membrane, and can also prevent an increase in a Gurley value and a decrease in heat contraction resistance of the porous membrane.

In the presently disclosed composition for a lithium ion secondary battery porous membrane, the polymer B preferably has a degree of swelling in electrolysis solution of at least a factor of 2.5 and no greater than a factor of 6.0. A degree of swelling in electrolysis solution of the polymer B within the aforementioned range enables further improvement of transition metal capturing ability and peel strength of the porous membrane.

The "degree of swelling in electrolysis solution" of a polymer in the present disclosure can be obtained as a value (factor) calculated by dividing the weight of a film obtained by casting the polymer (cast film) after the cast film has been immersed in a specific electrolysis solution under specific conditions by the weight of the cast film prior to immersion in the electrolysis solution. More specifically, the cast film can be obtained by the method described in the EXAMPLES section of the present specification and measurement thereof can be carried out by the measurement method also described in the EXAMPLES section.

Moreover, the present disclosure aims to advantageously solve the problems described above by disclosing a porous membrane for a lithium ion secondary battery formed using any one of the compositions for a lithium ion secondary battery porous membrane described above. Through use of any of the compositions described above in this manner, a porous membrane for a lithium ion secondary battery can be obtained that has excellent capturing ability with respect to transition metal ions, while also ensuring performance in terms of peel strength and so forth.

Furthermore, the present disclosure aims to advantageously solve the problems described above by disclosing a lithium ion secondary battery comprising: a positive electrode mixed material layer containing a transition metal-containing positive electrode active material; and the porous membrane for a lithium ion secondary battery described above. A lithium ion secondary battery having excellent life characteristics, such as cycle characteristics, can be obtained through inclusion therein of the porous membrane described above and a positive electrode mixed material layer containing a transition metal-containing positive electrode active material since the porous membrane can capture transition metal ions, such as cobalt ions, that elute into an electrolysis solution from the positive electrode active material.

Advantageous Effect

According to the present disclosure, it is possible to obtain a composition for a lithium ion secondary battery porous membrane capable of forming a porous membrane having excellent capturing ability with respect to transition metal ions, such as cobalt ions, that elute into an electrolysis solution from a positive electrode active material, while also ensuring performance in terms of peel strength and so forth.

Moreover, according to the present disclosure, it is possible to obtain a porous membrane for a lithium ion secondary battery that has excellent capturing ability with respect to transition metal ions, such as cobalt ions, that elute into an electrolysis solution from a positive electrode active material, and excellent performance in terms of peel strength and so forth.

Furthermore, according to the present disclosure, it is possible to obtain a lithium ion secondary battery having excellent life characteristics, such as cycle characteristics.

DETAILED DESCRIPTION

The following provides a detailed description of embodiments. However, the present disclosure is not limited to the following embodiments.

Herein, a presently disclosed composition for a lithium ion secondary battery porous membrane can be used in formation of a presently disclosed porous membrane for a lithium ion secondary battery. Furthermore, a presently disclosed lithium ion secondary battery includes the presently disclosed porous membrane for a lithium ion secondary battery.

(Composition for Lithium Ion Secondary Battery Porous Membrane)

The presently disclosed composition for a lithium ion secondary battery porous membrane contains non-conductive particles and a binding material. Moreover, the binding material includes a polymer A including an aliphatic conjugated diene monomer unit and a polymer B including a (meth)acrylic acid ester monomer unit. A feature of the presently disclosed composition for a lithium ion secondary battery porous membrane is that the polymer A includes the aliphatic conjugated diene monomer unit in a proportion of greater than 85 mass %, the polymer B includes the (meth)acrylic acid ester monomer unit in a proportion of at least 60 mass %, and a mass basis ratio of content of the polymer A relative to content of the polymer B (polymer A/polymer B) is at least 0.2 and no greater than 9.0.

<Non-Conductive Particles>

The non-conductive particles are particles that are non-conductive and that maintain their shape without dissolving in a dispersion medium such as water or an electrolysis solution of a secondary battery. The non-conductive particles are electrochemically stable and, as a result, are present stably within a porous membrane in a usage environment of a secondary battery. Through use of the non-conductive particles in a porous membrane, a net-like structure of the porous membrane can be blocked to an appropriate degree such that lithium dendrites and the like are prevented from passing through the porous membrane, and the porous membrane can be provided with sufficient strength and heat resistance. Various types of inorganic particles and organic particles can be used as the non-conductive particles.

Examples of inorganic particles that can be used include particles of oxides such as aluminum oxide (alumina), hydrous aluminum oxide (boehmite), silicon oxide, magnesium oxide, titanium oxide, $BaTiO_2$, ZrO, and alumina-silica composite oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary.

Examples of organic particles that can be used include particles of various crosslinked polymers such as polyethylene, polystyrene, polydivinyl benzene, crosslinked styrene-divinyl benzene copolymer, polyimide, polyamide, polyamide imide, melamine resin, phenolic resin, and benzoguanamine-formaldehyde condensate; and particles of heat resistant polymers such as polysulfone, polyacrylonitrile, polyaramid, polyacetal, and thermoplastic polyimide.

One type of non-conductive particles may be used individually, or two or more types of non-conductive particles may be used in combination.

Of the above examples, inorganic particles are preferable, aluminum oxide (alumina), hydrous aluminum oxide (boehmite), and barium sulfate are more preferable, and aluminum oxide (alumina) and barium sulfate are even more preferable as the non-conductive particles from a viewpoint of improving durability of a porous membrane and battery characteristics of a secondary battery that includes the porous membrane.

The volume average particle diameter D50 of the non-conductive particles is preferably at least 0.01 µm, more preferably at least 0.1 µm, and even more preferably at least 0.2 µm, and is preferably no greater than 5 µm, more preferably no greater than 3 µm, and even more preferably no greater than 1 µm. Use of non-conductive particles having a volume average particle diameter D50 such as described above enables an appropriate packing rate of the non-conductive particles in the resultant porous membrane and can ensure heat contraction resistance of the porous membrane.

The "volume average particle diameter D50" of the non-conductive particles represents a particle diameter at which, in a particle size distribution (volume basis) measured by laser diffraction, the cumulative volume calculated from a small diameter end of the distribution reaches 50%.

The specific surface area of the non-conductive particles is preferably at least 1.0 $m^2/g$, more preferably at least 2.0 $m^2/g$, and even more preferably at least 3.0 $m^2/g$, and is preferably no greater than 10 $m^2/g$, more preferably no greater than 7.5 $m^2/g$, and even more preferably no greater than 6.3 $m^2/g$. Use of non-conductive particles having a specific surface area that is at least any of the aforementioned lower limits enables an appropriate packing rate of the non-conductive particles in the resultant porous membrane and can inhibit reduction of heat contraction resistance of the porous membrane. Moreover, use of non-conductive particles having a specific surface area that is no greater than any of the aforementioned upper limits can inhibit deterioration of battery characteristics of a secondary battery caused by an increase in moisture content of the porous membrane.

The term "specific surface area" refers to a nitrogen adsorption specific surface area that is measured by the BET method.

<Binding Material>

In a porous membrane for a lithium ion secondary battery formed using the presently disclosed composition for a lithium ion secondary battery porous membrane, the binding material is a component that ensures strength of the porous membrane and holds together components contained in the porous membrane such that these components do not become detached from the porous membrane.

A feature of the binding material used in the presently disclosed composition for a lithium ion secondary battery porous membrane is that the binding material includes, in a specific ratio, the polymer A including the aliphatic conjugated diene monomer unit in a specific proportion and the polymer B including the (meth)acrylic acid ester monomer unit in a specific proportion. When a porous membrane is formed using a composition containing a binding material that includes, in a specific ratio, a polymer A including an aliphatic conjugated diene monomer unit in a specific proportion and a polymer B including a (meth)acrylic acid ester monomer unit in a specific proportion as described above, it is possible to obtain a porous membrane having excellent capturing ability with respect to transition metal ions, while also ensuring performance in terms of peel strength and so forth.

Although it is yet to be clarified why transition metal capturing ability can be improved while ensuring performance in terms of peel strength and so forth through combined use, in a specific ratio, of the polymer A including the aliphatic conjugated diene monomer unit in a specific proportion and the polymer B including the (meth)acrylic acid ester monomer unit in a specific proportion, the reason for these effects is presumed to be as follows. Specifically, the polymer A including the aliphatic conjugated diene monomer unit in a specific proportion displays high transition metal capturing ability. Therefore, the transition metal capturing ability of a porous membrane can be improved through use of this polymer A as a binding material. On the other hand, it may not be possible to ensure sufficient peel strength of the porous membrane if the polymer A is used individually. However, performance in terms of peel strength of the porous membrane and so forth can be ensured by using the polymer B including the (meth)acrylic acid ester monomer unit in a specific proportion in combination with the polymer A. Furthermore, although it is thought that a decrease in the proportion constituted by the polymer A in the binding material generally leads to a decrease in transition metal capturing ability of the porous membrane, in a situation in which the polymer B including the (meth)acrylic acid ester monomer unit in a specific proportion is used in combination with the polymer A in a specific proportion, transition metal capturing ability of the porous membrane as a whole can be improved through interaction between the polymer A and the polymer B when swollen in an electrolysis solution for a reason that is not yet clear.

It should be noted that the presently disclosed composition for a lithium ion secondary battery porous membrane may contain other monomers as the binding material in addition to the polymer A and the polymer B to an extent that does not impair the effects disclosed herein.

[Polymer A]

The polymer A is normally not a polymer that is water-soluble and may be present in the form of particles in a dispersion medium such as water. The polymer A may maintain its particulate form when contained in a porous membrane. However, the polymer A may alternatively not be present in the form of particles in a dispersion medium or a porous membrane. When a polymer is referred to as "water-soluble" in the present disclosure, this means that when 0.5 g of the polymer is dissolved in 100 g of water at 25° C., insoluble content is less than 0.5 mass %.

The polymer A is required to include the aliphatic conjugated diene monomer unit in a proportion of greater than 85 mass %, and may optionally include an acid group-containing monomer unit and other monomer units.

[[Aliphatic Conjugated Diene Monomer Unit]]

Examples of aliphatic conjugated diene monomers that can be used to form the aliphatic conjugated diene monomer unit include 1,3-butadiene, 2-methyl-1,3-butadiene (isoprene), 2,3-dimethyl-1,3-butadiene, 2-chloro-1,3-butadiene (chloroprene), substituted linear conjugated pentadienes, and substituted and side-chain conjugated hexadienes. Of these aliphatic conjugated diene monomers, 1,3-butadiene is preferable since it effectively increases the transition metal capturing ability of a porous membrane containing the polymer A.

One of such aliphatic conjugated diene monomers may be used individually, or two or more of such aliphatic conjugated diene monomers may be used in combination.

The proportion constituted by the aliphatic conjugated diene monomer unit in the polymer A is required to be greater than 85 mass %, and is preferably from 90 mass % to 100 mass %, more preferably from 95 mass % to 100 mass %, and even more preferably from 98 mass % to 100 mass %. If the proportion constituted by the aliphatic conjugated diene monomer unit is not greater than 85 mass %, it is not possible to obtain a porous membrane having sufficient transition metal capturing ability.

—Proportion of Trans-1,4 Bonding—

An aliphatic conjugated diene monomer can normally at least form cis-1,4 bonded, trans-1,4 bonded, and vinyl bonded monomer units through a polymerization reaction. For example, 1,3-butadiene can normally form cis-1,4 bonded, trans-1,4 bonded, and 1,2 bonded (vinyl bonded) monomer units through a polymerization reaction and isoprene can normally form cis-1,4 bonded and trans-1,4 bonded monomer units, as well as 1,2 bonded and 3,4 bonded (vinyl bonded) monomer units through a polymerization reaction.

In the aliphatic conjugated diene monomer unit of the polymer A, the proportion of trans-1,4 bonding is preferably at least 50 mol %, more preferably at least 55 mol %, and even more preferably at least 58 mol %, and is preferably no greater than 80 mol %, more preferably no greater than 75 mol %, even more preferably no greater than 71 mol %, and particularly preferably no greater than 65 mol %. As a result of the proportion of trans-1,4 bonding in the aliphatic conjugated diene monomer unit of the polymer A being at least the lower limit of any of the aforementioned ranges, transition metal capturing ability of the porous membrane can be further improved. Moreover, as a result of the proportion of trans-1,4 bonding in the aliphatic conjugated diene monomer unit of the polymer A being no greater than the upper limit of any of the aforementioned ranges, the polymer A can be obtained through easier polymerization conditions and flexibility of the porous membrane can be improved.

The "proportion of trans-1,4 bonding in an aliphatic conjugated diene monomer unit of a polymer" referred to in the present disclosure is defined as the proportion constituted by trans-1,4 bonded units among all aliphatic conjugated diene monomer units that are present in the polymer. The same definition applies to cis-1,4 bonding and vinyl bonding described below.

—Proportion of Cis-1,4 Bonding—

From a viewpoint of improving transition metal capturing ability of the porous membrane while ensuring flexibility of the porous membrane, the proportion of cis-1,4 bonding in the aliphatic conjugated diene monomer unit of the polymer A is preferably at least 5 mol %, more preferably at least 7 mol %, even more preferably at least 10 mol %, and particularly preferably at least 20 mol %, and is preferably no greater than 50 mol %, more preferably no greater than 45 mol %, even more preferably no greater than 40 mol %, and particularly preferably no greater than 30 mol %. As a result of the proportion of cis-1,4 bonding in the aliphatic conjugated diene monomer unit of the polymer A being at least the lower limit of any of the aforementioned ranges, the polymer A can be obtained through easier polymerization conditions and flexibility of the porous membrane can be improved. Moreover, as a result of the proportion of cis-1,4 bonding in the aliphatic conjugated diene monomer unit of the polymer A being no greater than the upper limit of any of the aforementioned ranges, transition metal capturing ability of the porous membrane can be further improved.

—Proportion of Vinyl Bonding—

From a viewpoint of improving transition metal capturing ability of the porous membrane while ensuring flexibility of the porous membrane, the proportion of vinyl bonding in the aliphatic conjugated diene monomer unit of the polymer A is preferably at least 5 mol %, more preferably at least 7 mol %, even more preferably at least 10 mol %, and particularly preferably at least 15 mol %, and is preferably no greater than 50 mol %, more preferably no greater than 40 mol %, even more preferably no greater than 30 mol %, and particularly preferably no greater than 20 mol %. As a result of the proportion of vinyl bonding in the aliphatic conjugated diene monomer unit of the polymer A being at least the lower limit of any of the aforementioned ranges, the polymer A can be obtained through easier polymerization conditions and flexibility of the porous membrane can be improved. Moreover, as a result of the proportion of vinyl bonding in the aliphatic conjugated diene monomer unit of the polymer A being no greater than the upper limit of any of the aforementioned ranges, transition metal capturing ability of the porous membrane can be further improved.

The proportion of each type of bonding in the aliphatic conjugated diene monomer unit of the polymer A can be adjusted by adjusting the polymerization conditions. Moreover, the proportion of each type of bonding in the aliphatic conjugated diene monomer unit of the polymer A can be determined in accordance with the IR method of JIS K6239.

[[Acid Group-Containing Monomer Unit]]

Examples of acid group-containing monomers that can be used to form the acid group-containing monomer unit include carboxylic acid group-containing unsaturated monomers, sulfonate group-containing unsaturated monomers, phosphate group-containing unsaturated monomers, and hydroxy group-containing unsaturated monomers.

One of such acid group-containing monomers may be used individually, or two or more of such acid group-containing monomers may be used in combination.

Examples of carboxylic acid group-containing unsaturated monomers include ethylenically unsaturated monocarboxylic acids and derivatives thereof, ethylenically unsaturated dicarboxylic acids and derivatives thereof, and acid anhydrides of ethylenically unsaturated dicarboxylic acids and derivatives thereof.

Examples of ethylenically unsaturated monocarboxylic acids include (meth)acrylic acid and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, and itaconic acid. Examples of acid anhydrides of ethylenically unsaturated dicarboxylic acids include maleic anhydride, acrylic anhydride, methylmaleic anhydride, and dimethylmaleic anhydride. Examples of derivatives of ethylenically unsaturated dicarboxylic acids include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleates.

Examples of sulfonate group-containing unsaturated monomers include vinyl sulfonic acid, methyl vinyl sulfonic acid, (meth)allyl sulfonic acid, 2-sulfoethyl (meth)acrylate, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing unsaturated monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing unsaturated monomers include 2-hydroxyethyl acrylate, 2-hydroxypropyl acrylate, 2-hydroxyethyl methacrylate, and 2-hydroxypropyl methacrylate.

Of these monomers, a carboxylic acid group-containing unsaturated monomer is preferable, an ethylenically unsaturated monocarboxylic acid is more preferable, and (meth)acrylic acid is particularly preferable as an acid group-containing monomer from a viewpoint of increasing shape stability of the polymer A.

The proportion constituted by the acid group-containing monomer unit in the polymer A is preferably at least 0.1 mass %, more preferably at least 0.5 mass %, and even more preferably at least 1 mass %, is required to be less than 15 mass %, and is preferably no greater than 10 mass %, and more preferably no greater than 5 mass %. As a result of the proportion constituted by the acid group-containing monomer unit in the polymer A being at least the lower limit of any of the aforementioned ranges, shape stability of the polymer A can be sufficiently improved and aggregation can be prevented when the polymer A is used in production of the composition for a lithium ion secondary battery porous membrane. Moreover, as a result of the proportion constituted by the acid group-containing monomer unit in the polymer A being no greater than the upper limit of any of the aforementioned ranges, dissolution of the polymer A in a hydrophilic solvent can be inhibited and stability of the composition for a lithium ion secondary battery porous membrane produced using the polymer A can be increased.

[[Other Monomer Units]]

The polymer A may further include other monomer units besides the aliphatic conjugated diene monomer unit and the acid group-containing monomer unit described above. Examples of these other monomer units include an aromatic vinyl monomer unit and a nitrile group-containing monomer unit.

—Aromatic Vinyl Monomer Unit—

Examples of aromatic vinyl monomers that can be used to form the aromatic vinyl monomer unit include styrene, α-methylstyrene, vinyltoluene, and divinyl benzene. Of these monomers, styrene is preferable as an aromatic vinyl monomer. One of such aromatic vinyl monomers may be used individually, or two or more of such aromatic vinyl monomers may be used in combination.

—Nitrile Group-Containing Monomer Unit—

Examples of nitrile group-containing monomers that can be used to form the nitrile group-containing monomer unit include α,β-ethylenically unsaturated nitrile monomers. No specific limitations are placed on α,β-ethylenically unsaturated nitrile monomers that can be used other than being an α,β-ethylenically unsaturated compound that contains a nitrile group. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable, and acrylonitrile is more preferable as a nitrile group-containing monomer. One of such nitrile group-containing monomers may be used individually, or two or more of such nitrile group-containing monomers may be used in combination.

The proportion constituted by such other monomer units in the polymer A is required to be less than 15 mass %. As a result of the proportion constituted by the other monomer units in the polymer A being less than 15 mass %, transition metal capturing ability of the porous membrane can be improved through the presence of the aliphatic conjugated diene monomer unit.

[[Production of Polymer A]]

The polymer A is produced through polymerization of a monomer composition that contains the monomers described above. The proportion constituted by each monomer in the monomer composition is normally the same as the proportion constituted by the corresponding monomer unit in the target polymer A.

No specific limitations are placed on the mode of polymerization of the polymer A. For example, any of solution polymerization, suspension polymerization, bulk polymerization, and emulsion polymerization may be used. The polymerization reaction may be, for example, addition polymerization such as ionic polymerization, radical polymerization, or living radical polymerization. Commonly used emulsifiers, dispersants. polymerization initiators, polymerization aids, and the like may be used in the polymerization in an amount that is also the same as commonly used.

[[Properties of Polymer A]]

The polymer A produced by the method described above preferably has the following properties.

—Volume Average Particle Diameter D50—

The volume average particle diameter D50 of the polymer A is preferably at least 50 nm, more preferably at least 70 nm, even more preferably at least 90 nm, and particularly preferably at least 110 nm, and is preferably no greater than 700 nm, more preferably no greater than 500 nm, even more preferably no greater than 400 nm, and particularly preferably no greater than 200 nm. As a result of the volume average particle diameter D50 of the polymer A being at least the lower limit of any of the aforementioned ranges, the polymer A has a lower tendency to migrate during drying of the composition in a porous membrane formation process. Consequently, deterioration of lithium ion permeability of the porous membrane and deterioration of life characteristics and rate characteristics of a lithium ion secondary battery including the porous membrane can be inhibited. Moreover, as a result of the volume average particle diameter D50 of the polymer A being no greater than the upper limit of any of the aforementioned ranges, transition metal capturing ability and heat contraction resistance of the porous membrane can be sufficiently improved.

The "volume average particle diameter D50" of a polymer referred to in the present disclosure represents a particle diameter at which, in a particle size distribution (volume basis) measured by laser diffraction, the cumulative volume calculated from a small diameter end of the distribution reaches 50%. The volume average particle diameter D50 of the polymer A can be adjusted by altering the production conditions of the polymer A. Specifically, the volume average particle diameter D50 of the polymer A may be adjusted by, for example, appropriately altering the type and amount of an aid, such as an emulsifier, a dispersant, an inorganic electrolyte, or the like, that is used in polymerization.

—Degree of Swelling in Electrolysis Solution—

The degree of swelling in electrolysis solution of the polymer A is preferably greater than a factor of 1, more preferably at least a factor of 1.1, even more preferably at least a factor of 1.5, and particularly preferably at least a factor of 1.9, and is preferably less than a factor of 2.5, more preferably no greater than a factor of 2.4, and even more preferably no greater than a factor of 2.3. As a result of the degree of swelling in electrolysis solution of the polymer A being greater than a factor of 1, reduction of lithium ion permeability in a secondary battery and secondary battery rate characteristics can be inhibited. Moreover, transition metal ions that elute into an electrolysis solution can be effectively captured and battery stability can be increased through improved porous membrane peel strength. Conversely, as a result of the degree of swelling in electrolysis solution of the polymer A being less than a factor of 2.5, elution of the polymer A into an electrolysis solution can be inhibited such as to ensure durability of the porous membrane in the electrolysis solution, and battery stability can be increased through improved porous membrane peel strength.

The degree of swelling in electrolysis solution of the polymer A can be adjusted, for example, by appropriately selecting the type and amount of each monomer used in production of the polymer A in consideration of the SP value of the electrolysis solution, by adjusting the degree of crosslinking of the polymer, and by adjusting the molecular weight of the polymer.

In general, a polymer tends to swell more easily in an electrolysis solution when the SP value of the polymer is similar to the SP value of the electrolysis solution. Conversely, a polymer tends not to easily swell in an electrolysis solution when the SP value of the polymer differs significantly from the SP value of the electrolysis solution.

Note that the term "SP value" refers to the solubility parameter.

The SP value can be calculated by a method described in "Hansen Solubility Parameters: A User's Handbook, $2^{nd}$ Ed. (CRC Press)".

The SP value of an organic compound can be estimated from the molecular structure of the organic compound. Specifically, calculation may be performed using simulation software that can calculate an SP value from a SMILE formula (for example, "HSPiP" (http=//www.hansen-solubility.com)). This simulation software determines the SP value based on the theory described in "Hansen Solubility Parameters: A User's Handbook, $2^{nd}$ Ed., Charles M. Hansen".

[Polymer B]

The polymer B is normally not a polymer that is water-soluble, and is normally present in the form of particles in a dispersion medium such as water and maintains its particulate form when contained in a porous membrane. However, the polymer B may alternatively not be present in the form of particles in a dispersion medium or a porous membrane.

The polymer B is required to include a (meth)acrylic acid ester monomer unit in a proportion of at least 60 mass %, and may optionally include a crosslinkable monomer unit, an acid group-containing monomer unit, and other monomer units.

[[(Meth)Acrylic Acid Ester Monomer Unit]]

Examples of (meth)acrylic acid ester monomers that can be used to form the (meth)acrylic acid ester monomer unit include, but are not specifically limited to, alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, alkyl acrylates are preferable, ethyl acrylate, n-butyl acrylate, and 2-ethylhexyl acrylate are more preferable, and n-butyl acrylate is even more preferable.

One of such (meth)acrylic acid ester monomers may be used individually, or two or more of such (meth)acrylic acid ester monomers may be used in combination in a freely selected ratio.

The proportion constituted by the (meth)acrylic acid ester monomer unit in the polymer B is required to be at least 60 mass %, is preferably at least 65 mass %, more preferably at least 70 mass %, even more preferably at least 80 mass %, and particularly preferably at least 90 mass %, and is preferably no greater than 99 mass %, more preferably no greater than 98 mass %, and even more preferably no greater than 95 mass %. If the proportion constituted by the (meth)acrylic acid ester monomer unit is less than the lower limit of any the aforementioned ranges, it may not be possible to obtain a porous membrane having sufficient peel strength. On the other hand, if the proportion constituted by the (meth)acrylic acid ester monomer unit is greater than the upper limit of any of the aforementioned ranges, the polymer B may elute into an electrolysis solution and secondary battery rate characteristics may be reduced.

[[Crosslinkable Monomer Unit]]

Crosslinkable monomers that can be used to form the crosslinkable monomer unit are typically monomers that are thermally crosslinkable. More specific examples of crosslinkable monomers that can be used include monofunctional monomers having a thermally crosslinkable group and one olefinic double bond per molecule, and multifunctional monomers having two or more olefinic double bonds per molecule.

Examples of thermally crosslinkable groups include an epoxy group, an N-methylol amide group, an oxetanyl group, an oxazoline group, and combinations thereof. Of these thermally crosslinkable groups, an epoxy group is preferable in terms of ease with which crosslinking and crosslink density can be adjusted.

Examples of crosslinkable monomers having an epoxy group as a thermally crosslinkable group and having an olefinic double bond include unsaturated glycidyl ethers such as vinyl glycidyl ether, allyl glycidyl ether, butenyl glycidyl ether, and o-allyl phenyl glycidyl ether; monoepoxides of dienes and polyenes such as butadiene monoepoxide, chloroprene monoepoxide, 4,5-epoxy-2-pentene, 3,4-epoxy-1-vinyl cyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of crosslinkable monomers having an N-methylol amide group as a thermally crosslinkable group and having an olefinic double bond include (meth)acrylamides having a methylol group such as N-methylol(meth)acrylamide.

In the present specification, "(meth)acrylamide" is used to indicate "acrylamide" and/or "methacrylamide".

Examples of crosslinkable monomers having an oxetanyl group as a thermally crosslinkable group and having an olefinic double bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of crosslinkable monomers having an oxazoline group as a thermally crosslinkable group and having an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of multifunctional monomers having two or more olefinic double bonds include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, allyl and vinyl ethers of multifunctional alcohols other than those listed above, triallylamine, methylene bisacrylamide, and divinyl benzene.

In the present specification, "(meth)acrylate" is used to indicate "acrylate" and/or "methacrylate".

Of these examples, N-methylolacrylamide and allyl glycidyl ether, in particular, are more preferable as crosslinkable monomers.

One crosslinkable monomer may be used individually, or two or more crosslinkable monomers may be used in combination in a freely selected ratio.

The proportion constituted by the crosslinkable monomer unit in the polymer B is preferably at least 0.10 mass %, more preferably at least 0.15 mass %, even more preferably at least 0.20 mass %, and particularly preferably at least 1.0 mass %, and is preferably no greater than 5.0 mass %, more preferably no greater than 4.0 mass %, even more preferably no greater than 3.0 mass %, and particularly preferably no greater than 2.5 mass %. As a result of the proportion constituted by the crosslinkable monomer unit in the polymer B being at least the lower limit of any of the aforementioned ranges, mechanical strength of the polymer B can be increased and thus porous membrane peel strength can be increased, whereas, as a result of the proportion constituted by the crosslinkable monomer unit in the polymer B being no greater than the upper limit of any of the aforementioned ranges, porous membrane durability can be increased.

[[Acid Group-Containing Monomer Unit]]

Examples of acid group-containing monomers that can be used to form the acid group-containing monomer unit of the polymer B include the same acid group-containing monomers as can be used for the polymer A. Of these acid group-containing monomers, carboxylic acid group-containing unsaturated monomers are preferable, ethylenically unsaturated monocarboxylic acids are more preferable, and (meth)acrylic acid is even more preferable from a viewpoint of increasing shape stability of the polymer B.

The proportion constituted by the acid group-containing monomer unit in the polymer B is preferably at least 0.1 mass %, more preferably at least 0.5 mass %, even more preferably at least 1 mass %, and particularly preferably at least 1.5 mass %, and is preferably no greater than 15 mass %, more preferably no greater than 10 mass %, even more preferably no greater than 5 mass %, and particularly preferably no greater than 3 mass %. As a result of the proportion constituted by the acid group-containing monomer unit in the polymer B being at least the lower limit of any of the aforementioned ranges, shape stability of the polymer B can be sufficiently improved and aggregation can be prevented when the polymer B is used in production of the composition for a lithium ion secondary battery porous membrane. Moreover, as a result of the proportion constituted by the acid group-containing monomer unit in the polymer B being no greater than the upper limit of any of the aforementioned ranges, dissolution of the polymer B in a hydrophilic solvent can be inhibited and stability of the composition for a lithium ion secondary battery porous membrane produced using the polymer B can be increased.

[[Other Monomer Units]]

The polymer B may further include other monomer units besides the (meth)acrylic acid ester monomer unit, the crosslinkable monomer unit, and the acid group-containing monomer unit described above. Examples of these other monomer units include an aromatic vinyl monomer unit and a nitrile group-containing monomer unit.

—Aromatic Vinyl Monomer Unit—

Examples of aromatic vinyl monomers that can be used to form the aromatic vinyl monomer unit include styrene, α-methylstyrene, vinyltoluene, and divinyl benzene. Of these examples, styrene is preferable as an aromatic vinyl monomer. One of such aromatic vinyl monomers may be used individually, or two or more of such aromatic vinyl monomers may be used in combination.

—Nitrile Group-Containing Monomer Unit—

Examples of nitrile group-containing monomers that can be used to form the nitrile group-containing monomer unit include α,β-ethylenically unsaturated nitrile monomers. No specific limitations are placed on α,β-ethylenically unsaturated nitrile monomers that can be used other than being an α,β-ethylenically unsaturated compound that contains a nitrile group. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable, and acrylonitrile is more preferable as a nitrile group-containing monomer. One of such nitrile group-containing monomers may be used individually, or two or more of such nitrile group-containing monomers may be used in combination.

The proportion constituted by such other monomer units in the polymer B is preferably at least 0.5 mass %, more preferably at least 1.0 mass %, and even more preferably at least 1.5 mass %, is required to be no greater than 40 mass %, and is preferably no greater than 10 mass %. As a result of the proportion constituted by such other monomer units in the polymer B being at least the lower limit of any of the aforementioned ranges, polymer strength of the polymer B can be increased and a porous membrane having a smaller amount of dusting can be obtained, whereas, as a result of the proportion constituted by such other monomer units in the polymer B being no greater than the upper limit of any of the aforementioned ranges, the tendency of the polymer B to elute can be reduced while maintaining swelling properties of the polymer B in electrolysis solution even at high temperatures, which enables a secondary battery to display excellent high-temperature characteristics.

[[Production of Polymer B]]

The polymer B is produced through polymerization of a monomer composition that contains the monomers described above. The proportion constituted by each monomer in the monomer composition is normally the same as the proportion constituted by the corresponding monomer unit in the target polymer B.

No specific limitations are placed on the mode of polymerization of the polymer B. For example, any of solution polymerization, suspension polymerization, bulk polymerization, and emulsion polymerization may be used. The polymerization reaction may be, for example, addition polymerization such as ionic polymerization, radical polymerization, or living radical polymerization. Commonly used emulsifiers, dispersants. polymerization initiators, polymerization aids, and the like may be used in the polymerization in an amount that is also the same as commonly used.

[[Properties of Polymer B]]

The polymer B produced by the method described above preferably has the following properties.

—Volume Average Particle Diameter D50—

The volume average particle diameter D50 of the polymer B is preferably at least 100 nm, more preferably at least 150 nm, even more preferably at least 250 nm, and particularly preferably at least 350 nm, and is preferably no greater than 700 nm, more preferably no greater than 500 nm, even more preferably no greater than 400 nm, and particularly preferably no greater than 380 nm. As a result of the volume average particle diameter D50 of the polymer B being at least the lower limit of any of the aforementioned ranges, the tendency of the polymer B to migrate during drying of the composition in a porous membrane formation process can be reduced, the binding strength between the non-conductive particles in the porous membrane can be increased, and dusting can be prevented. Moreover, as a result of the volume average particle diameter D50 of the polymer B being no greater than the upper limit of any of the aforementioned ranges, the binding strength between the non-conductive particles in the porous membrane can be increased and dusting can be prevented without the specific surface area of the polymer B becoming too small.

The volume average particle diameter D50 of the polymer B can be adjusted by altering the production conditions of the polymer B. Specifically, the volume average particle diameter D50 of the polymer B may be adjusted by, for example, appropriately altering the type and amount of an aid, such as an emulsifier, a dispersant, an inorganic electrolyte, or the like, that is used in polymerization.

—Degree of Swelling in Electrolysis Solution—

The degree of swelling in electrolysis solution of the polymer B is preferably at least a factor of 2.5, and more preferably at least a factor of 3.0, and is preferably no greater than a factor of 6.0, more preferably no greater than a factor of 5.5, even more preferably no greater than a factor of 5.0, and particularly preferably no greater than a factor of 4.0. As a result of the degree of swelling in electrolysis solution of the polymer B being at least the lower limit of any of the aforementioned ranges, rate characteristics of a secondary battery can be improved since permeation of lithium ions in the secondary battery is not impeded, and transition metal capturing ability of the porous membrane can be further improved when the polymer B is used in combination with the polymer A. On the other hand, as a result of the degree of swelling in electrolysis solution of the polymer B being no greater than the upper limit of any of the aforementioned ranges, porous membrane peel strength can be improved.

The degree of swelling in electrolysis solution of the polymer B can be adjusted by the same methods as described for the polymer A.

[Polymer Content]

In the presently disclosed composition for a lithium ion secondary battery porous membrane, a mass basis ratio of the content of the above-described polymer A relative to the content of the above-described polymer B is required to be at least 0.2, and is preferably at least 0.4, more preferably at least 0.7, and even more preferably at least 1.0. Moreover, the mass basis ratio is required to be no greater than 9.0, and is preferably no greater than 8.0, more preferably no greater than 7.0, and even more preferably no greater than 5.0. As a result of the ratio of the content of the polymer A relative to the content of the polymer B being at least the lower limit of any of the aforementioned ranges, transition metal capturing ability in the porous membrane can be increased even when the polymer A and the polymer B are used in combination through an interaction between the polymer A and the polymer B, whereas, as a result of the ratio being no greater than the upper limit of any of the aforementioned ranges, porous membrane peel strength can be increased. Consequently, the stability of a secondary battery can be improved. Moreover, as a result of the ratio of the content of the polymer A relative to the content of the polymer B being no greater than the upper limit of any of the aforementioned ranges, the effect of improved transition metal capturing ability through interaction between the polymer A and the polymer B can be sufficiently achieved.

The content of the polymer A in the presently disclosed composition for a lithium ion secondary battery porous membrane relative to 100 parts by mass of the non-conductive particles is preferably at least 1 part by mass, more preferably at least 3 parts by mass, even more preferably at least 5 parts by mass, and particularly preferably at least 8 parts by mass, and is preferably no greater than 25 parts by mass, more preferably no greater than 20 parts by mass, even more preferably no greater than 15 parts by mass, and particularly preferably no greater than 13 parts by mass. As a result of the content of the polymer A being at least the lower limit of any of the aforementioned ranges, the polymer A, which displays high transition metal capturing ability, is present in a sufficient amount, and thus transition metal capturing ability of the porous membrane can be increased and battery characteristics can be improved. Moreover, as a result of the content of the polymer A being no greater than the upper limit of any of the aforementioned ranges, deterioration of lithium ion permeability and an increase in the Gurley value of the porous membrane can be inhibited, and a decrease in heat contraction resistance of the porous membrane due to increased polymer content in the porous membrane can be prevented.

The content of the polymer B in the presently disclosed composition for a lithium ion secondary battery porous membrane relative to 100 parts by mass of the non-conductive particles is preferably at least 1 part by mass, more preferably at least 2 parts by mass, and even more preferably at least 2.5 parts by mass, and is preferably no greater than 25 parts by mass, more preferably no greater than 15 parts by mass, even more preferably no greater than 10 parts by mass, and particularly preferably no greater than 8 parts by mass. As a result of the content of the polymer B being at least the lower limit of any of the aforementioned ranges, the adhesiveness between components in the porous membrane and porous membrane peel strength can be increased, and detachment of the non-conductive particles can be prevented. On the other hand, as a result of the content of the polymer B being no greater than the upper limit of any of the aforementioned ranges, deterioration of lithium ion permeability and an increase in the Gurley value of the porous membrane can be inhibited, and a decrease in heat contraction resistance of the porous membrane due to increased polymer content in the porous membrane can be prevented.

The total content of the polymer A and the polymer B in the presently disclosed composition for a lithium ion secondary battery porous membrane per 100 parts by mass of the non-conductive particles is preferably at least 2 parts by mass, more preferably at least 4 parts by mass, even more preferably at least 6 parts by mass, and particularly preferably at least 8 parts by mass, and is preferably no greater than 50 parts by mass, more preferably no greater than 30 parts by mass, even more preferably no greater than 20 parts by mass, and particularly preferably no greater than 18 parts by mass. As a result of the total content of the polymer A and the polymer B being at least the lower limit of any of the aforementioned ranges, transition metal capturing ability of the porous membrane can be sufficiently increased and porous membrane peel strength can also be increased. On the other hand, as a result of the total content of the polymer A and polymer B being no greater than the upper limit of any of the aforementioned ranges, deterioration of lithium ion permeability and an increase in the Gurley value of the porous membrane can be inhibited, and a decrease in heat contraction resistance of the porous membrane due to increased polymer content in the porous membrane can be prevented.

[Transition Metal Capturing Ability]

The transition metal capturing ability of the binding material is preferably at least 200 mass ppm, more preferably at least 350 mass ppm, even more preferably at least 500 mass ppm, and particularly preferably at least 600 mass ppm. As a result of the binding material in which the polymer A and the polymer B are used in combination having a transition metal capturing ability that is at least the lower limit of any of the aforementioned ranges, a porous membrane containing the binding material can sufficiently capture transition metal ions, and excellent secondary battery life characteristics, such as expansion resistance and cycle characteristics, can be achieved. Although the transition metal capturing ability of the binding material is preferably as high as possible, the transition metal capturing ability is normally no greater than 1,000 mass ppm from a viewpoint of polymerizability of the polymers constituting the binding material.

In the present disclosure, the "transition metal capturing ability" of a composition (binding material) obtained by mixing the polymer A and the polymer B is defined as "the cobalt concentration (mass ppm) of a film of 500 μm in thickness and 12 mm in diameter, formed from the binding material, after the film is immersed in a cobalt chloride ($CoCl_2$) solution for 5 days at 25° C., wherein the cobalt chloride ($CoCl_2$) solution is a solution having a cobalt concentration of 18 mass ppm in which a mixture of ethyl methyl carbonate and ethylene carbonate (ethyl methyl carbonate:ethylene carbonate=70:30 (mass ratio)) is used as a solvent".

The film of 500 μm in thickness and 12 mm in diameter can be prepared by pouring an aqueous dispersion of the binding material into a petri dish or other flat-bottomed container such as to have a thickness of 500 μm after drying, drying the aqueous dispersion of the binding material for 5 days at 25° C., and subsequently punching out a film of 12 mm in diameter from the dried product. The cobalt chloride solution can be prepared by mixing the aforementioned solvent and cobalt chloride by a known method. Although no specific limitations are placed on the amount of the cobalt chloride solution in which the film is immersed, the amount of the cobalt chloride solution is typically 10 g.

The "transition metal capturing ability of the binding material" is an index obtained by evaluating capturing ability with respect to transition metal ions using cobalt as a representative example of a transition metal. The magnitude of transition metal capturing ability determined for the binding material using cobalt normally correlates with the magnitude of transition metal capturing ability of the binding material with respect to other transition metals. In other words, a binding material having high transition metal capturing ability determined using cobalt also has relatively high capturing ability with respect to other transition metals (for example, nickel and manganese), and a binding material having low transition metal capturing ability determined using cobalt also has relatively low capturing ability with respect to other transition metals.

The transition metal capturing ability of the binding material can be controlled by, for example, adjusting the compositions of the polymer A and the polymer B and the blending ratio of the polymer A and the polymer B. For example, the transition metal capturing ability of the binding material can be increased by increasing the proportion constituted by the aliphatic conjugated diene monomer unit, such as 1,3-butadiene, in the polymer A, increasing the proportion of trans-1,4 bonding in the aliphatic conjugated diene monomer unit of the polymer A by lowering the polymerization temperature thereof, increasing the molecular weight of the polymer A by lengthening the polymerization reaction time thereof, increasing the degree of swelling in electrolysis solution of the polymer B, or setting the blending ratio of the polymer A and the polymer B within an appropriate range.

<Other Components>

Examples of other components besides the binding material and the non-conductive particles that may be contained in the composition for a porous membrane include known additives such as dispersants, viscosity modifiers, wetting agents, and additives for electrolysis solution. Commonly known examples of such other components can be used without any specific limitations so long as they do not affect the battery reactions. One of such additives may be used individually, or two or more of such additives may be used in combination in a freely selected ratio.

[Dispersants]

Known dispersants may be used without any specific limitations. However, a water-soluble polymer including an acidic group-containing monomer unit, or an ammonium salt or alkali metal salt thereof, is preferable as a dispersant. The acidic group-containing monomer unit is a structural unit formed through polymerization of an acidic group-containing monomer. Moreover, the acidic group-containing monomer is a monomer that contains an acidic group.

Examples of acidic group-containing monomers that can be used include the previously described carboxylic acid group-containing monomers, sulfonate group-containing monomers, and phosphate group-containing monomers.

The amount of the dispersant that is blended per 100 parts by mass of the non-conductive particles is preferably at least 0.05 parts by mass, more preferably at least 0.1 parts by mass, and even more preferably at least 0.15 parts by mass, and is preferably no greater than 2 parts by mass, more preferably no greater than 1.5 parts by mass, and even more preferably no greater than 1 part by mass.

[Viscosity Modifier]

Known viscosity modifiers may be used without any specific limitations. However, a water-soluble polymer such as carboxymethyl cellulose, a salt thereof, or polyacrylamide is preferable as a viscosity modifier from a viewpoint of increasing heat contraction resistance of a porous membrane.

The amount of the viscosity modifier that is blended per 100 parts by mass of the non-conductive particles is preferably at least 0.1 parts by mass, more preferably at least 0.5 parts by mass, and even more preferably at least 1 part by mass, and is preferably no greater than 10 parts by mass, more preferably no greater than 3 parts by mass, and even more preferably no greater than 2 parts by mass.

[Wetting Agent]

Known wetting agents can be used without any specific limitations. However, non-ionic surfactants and anionic surfactants are preferable, and a non-ionic surfactant such as an ethylene oxide-propylene oxide copolymer is more preferable as a wetting agent from a viewpoint of facilitating application of the composition for a porous membrane onto a substrate with an appropriate thickness.

The amount of the wetting agent that is blended per 100 parts by mass of the non-conductive particles is preferably at least 0.05 parts by mass, more preferably at least 0.1 parts by mass, and even more preferably at least 0.15 parts by mass, and is preferably no greater than 2 parts by mass, more preferably no greater than 1.5 parts by mass, and even more preferably no greater than 1 part by mass.

<Production of Composition for Lithium Ion Secondary Battery Porous Membrane>

The composition for a lithium ion secondary battery porous membrane can be produced by dissolving or dispersing the components described above in a hydrophilic solvent, such as water, that serves as a dispersion medium. Specifically, the components and the hydrophilic solvent may be mixed using a mixer such as a ball mill, a sand mill, a bead mill, a pigment disperser, a grinding machine, an ultrasonic disperser, a homogenizer, a planetary mixer, or a FILMIX to produce a slurry composition for a porous membrane.

[Hydrophilic Solvent]

Examples of hydrophilic solvents that can be used include water; ketones such as diacetone alcohol and α-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tert-butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. Note that water may be used as a main solvent and other hydrophilic solvents besides water may be mixed therewith to the extent that a dissolved or dispersed state of the components can be ensured.

(Porous Membrane for Lithium Ion Secondary Battery)

The presently disclosed porous membrane for a lithium ion secondary battery is formed using the composition for a lithium ion secondary battery porous membrane described above. The presently disclosed porous membrane for a lithium ion secondary battery is used as a component in production of the presently disclosed lithium ion secondary battery. Specifically, the presently disclosed porous membrane for a lithium ion secondary battery may be formed on a separator substrate so as to constitute part of a separator, may be used by itself as a separator, or may be formed on an electrode mixed material layer provided on a current collector so as to constitute part of an electrode.

As a result of the specific binding material being used in the presently disclosed porous membrane for a lithium ion secondary battery, the porous membrane can favorably capture transition metal ions in a secondary battery, while also ensuring peel strength with a separator substrate or electrode mixed material layer on which the porous membrane is formed.

<Formation of Porous Membrane for Lithium Ion Secondary Battery>

As explained above, the presently disclosed porous membrane for a lithium ion secondary battery can be formed using a composition for a porous membrane obtained by dissolving or dispersing the components described above in a hydrophilic solvent, such as water, that serves as a dispersion medium. Specifically, the porous membrane can be formed, for example, by applying the aforementioned composition for a porous membrane onto a suitable substrate to form an applied film and then drying the applied film. Accordingly, the porous membrane contains components that are contained in the composition for a porous membrane, except for the dispersion medium, in the same ratio as these components are contained in the composition for a porous membrane. Thus, the porous membrane normally contains the non-conductive particles, the polymer A, and the polymer B, and may optionally contain other components such as a dispersant. The porous membrane has excellent capturing ability with respect to a constituent transition metal of a positive electrode active material, while also ensuring performance in terms of peel strength and so forth. Consequently, even when a positive electrode mixed material layer containing a transition metal-containing positive electrode active material, such as $LiCoO_2$, is used in a secondary battery that includes the porous membrane, transition metal ions, such as cobalt ions, that elute into an electrolysis solution from the positive electrode active material can be favorably captured by the porous membrane. As a result, deposition of the transition metal ions on a negative electrode can be inhibited and the secondary battery can exhibit excellent life characteristics.

[Substrate]

No specific limitations are placed on the substrate onto which the composition for a porous membrane is applied. For example, in a situation in which the porous membrane is used by itself as a separator, the substrate may be a detachable substrate. When a detachable substrate is used as the substrate, a porous membrane that can be used as a separator is obtained as a free-standing film by forming an applied film of the composition for a porous membrane on the surface of the detachable substrate, drying the applied film to form the porous membrane, and peeling the porous membrane from the detachable substrate. The resultant free-standing film can be suitably used as a separator having a function of capturing transition metal ions that elute into an electrolysis solution from a positive electrode active material. Known detachable substrates can be used as the detachable substrate on which the porous membrane is formed without any specific limitations.

In a situation in which the porous membrane is used as a component that constitutes part of a separator, a separator substrate can be used as a substrate. Furthermore, in a situation in which the porous membrane is used as a component that constitutes part of an electrode, an electrode substrate obtained by forming an electrode mixed material layer on a current collector can be used as a substrate. In these situations, a separator or an electrode including the porous membrane can be easily produced by forming an applied film of the composition for a porous membrane on the surface of the separator substrate or the electrode substrate and then drying the applied film to form the porous membrane. The porous membrane that is provided on the separator substrate or the electrode substrate can be suitably used as a layer having a protective function of improving heat resistance, strength, and so forth of the separator substrate or the electrode substrate and a function of capturing transition metal ions that elute into an electrolysis solution from a positive electrode active material.

The porous membrane is preferably located between a positive electrode and a negative electrode in order to reliably capture transition metal ions that elute from a positive electrode active material of a positive electrode mixed material layer, before these transition metal ions come within proximity of the negative electrode; in other words, the porous membrane is preferably provided on a separator substrate so as to constitute part of a separator.

[[Separator Substrate]]

The separator substrate on which the porous membrane may be formed is not specifically limited and may be a known separator substrate such as an organic separator. The organic separator is a porous member formed from an organic material and examples thereof include non-woven fabric and fine porous membranes containing a polyolefin resin such as polyethylene or polypropylene, an aromatic polyamide resin, or the like. Of such organic separators, non-woven fabric and fine porous membranes made from polyethylene are preferable due to having excellent strength. Although the thickness of the organic separator can be freely selected, the thickness is normally at least 0.5 μm, and preferably at least 5 μm, and is normally no greater than 40 μm, preferably no greater than 30 μm, and more preferably no greater than 20 μm.

[[Electrode Substrate]]

The electrode substrate (positive/negative electrode substrate) on which the porous membrane may be formed is not specifically limited and may, for example, be an electrode substrate obtained by forming an electrode mixed material layer on a current collector.

Herein, the current collector, components in the electrode mixed material layer (for example, an electrode active material (positive/negative electrode active material) and a binding material for an electrode mixed material layer (binding material for a positive/negative electrode mixed material layer)), and the method by which the electrode mixed material layer is formed on the current collector may be known examples thereof such as described, for example, in JP 2013-145763 A.

In particular, a transition metal-containing compound such as a transition metal oxide, a transition metal sulfide, or a composite metal oxide of lithium and a transition metal may be used as the positive electrode active material in order to improve battery capacity. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide of lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn ($Li(Co\ Mn\ Ni)O_2$), lithium-containing composite oxide of Ni—Mn—Al, lithium-containing composite oxide of Ni—Co—Al, and a solid solution comprising $LiMaO_2$ and $Li_2MbO_3$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal.

Examples of the lithium-containing composite metal oxide with an olivine structure include olivine-type lithium phosphate compounds represented by the formula $Li_yM$-$dPO_4$, such as olivine-type lithium iron phosphate ($LiFePO_4$) and olivine-type manganese lithium phosphate ($LiMnPO_4$), where Md represents one or more types of transition metals having an average oxidation state of 3+, examples of which include Mn, Fe, and Co, and y represents a number satisfying $0 \leq y \leq 2$. Md of the olivine-type lithium phosphate compounds represented by the formula $Li_yM$-$dPO_4$ may be partly substituted with another metal. Examples of the metal that may substitute part of Md include Cu, Mg, Zn, V, Ca, Sr, Ba, Ti, Al, Si, B, and Mo.

Of the above examples, a composite metal oxide of lithium and a transition metal is preferable, a lithium-containing composite metal oxide with a layered structure is more preferable, and lithium-containing cobalt oxide ($LiCoO_2$) is even more preferable from a viewpoint of increasing the capacity of a lithium ion secondary battery and also from a viewpoint of output characteristics and high-temperature cycle characteristics of a lithium ion secondary battery.

The method by which an applied film of the composition for a porous membrane is formed on a substrate is not specifically limited and may be a commonly known method. Specifically, the applied film may be formed by, for example, doctor blading, dip coating, reverse roll coating, direct roll coating, gravure coating, extrusion coating, or brush coating. The thickness of the applied film on the substrate after application but prior to drying can be set as appropriate in accordance with the thickness of the porous membrane that is to be obtained after drying.

Moreover, the method by which the applied film of the composition for a porous membrane is dried on the substrate is not specifically limited and may be a commonly known method such as drying by warm, hot, or low-humidity air; drying in a vacuum; or drying by irradiation of infrared light or electron beams.

After the composition for a porous membrane has been dried, the resultant porous membrane may be subjected to pressing treatment by mold pressing, roll pressing, or the like. The pressing treatment can improve close adherence between the porous membrane and the substrate.

<Properties of Porous Membrane for Lithium Ion Secondary Battery>

The porous membrane formed by the method described above preferably has the following properties.

[Thickness]

The thickness of the porous membrane is preferably at least 0.5 μm, more preferably at least 0.75 μm, and even more preferably at least 1 μm, and is preferably no greater than 10 μm, more preferably no greater than 7 μm, and even more preferably no greater than 5 μm. As a result of the thickness of the porous membrane being at least the lower limit of any of the aforementioned ranges, sufficient strength of the porous membrane can be ensured and transition metal originating from a positive electrode active material can be more adequately captured such that battery characteristics of a secondary battery in which the porous membrane is used can be improved. Moreover, as a result of the thickness of the porous membrane being no greater than the upper limit of any of the aforementioned ranges, diffusivity of an electrolysis solution can be ensured and a secondary battery can be made sufficiently compact.

(Lithium Ion Secondary Battery)

The presently disclosed lithium ion secondary battery includes: a positive electrode mixed material layer containing a transition metal-containing positive electrode active material; and the porous membrane for a lithium ion secondary battery described above. More specifically, the presently disclosed lithium ion secondary battery includes a positive electrode, a negative electrode, a separator, and an electrolysis solution, and the porous membrane for a lithium ion secondary battery described above is provided between a positive electrode mixed material layer of the positive electrode and a negative electrode mixed material layer of the negative electrode. In the presently disclosed lithium ion secondary battery, the presently disclosed porous membrane can effectively capture transition metal ions that elute into the electrolysis solution from the positive electrode active material such that deposition of these transition metal ions on the negative electrode is inhibited. As a result, the presently disclosed lithium ion secondary battery has excellent life characteristics, such as cycle characteristics.

<Positive Electrode, Negative Electrode, and Separator>

At least one of the positive electrode, the negative electrode, and the separator used in the presently disclosed lithium ion secondary battery includes a porous membrane. Specifically, an electrode produced by providing a porous membrane on an electrode substrate that is obtained by forming an electrode mixed material layer on a current collector can be used as a porous membrane-containing positive electrode or a porous membrane-containing negative electrode. Moreover, a separator produced by providing a porous membrane on a separator substrate or a separator composed by a porous membrane can be used as a porous membrane-containing separator. The electrode substrate and the separator substrate can be any of the examples previously described in the "Substrate" section.

A positive electrode, negative electrode, or separator that does not include a porous membrane can be used without any specific limitations. For example, an electrode composed of an electrode substrate such as previously described or a separator composed of a separator substrate such as previously described may be used.

It should also be noted that the positive electrode, the negative electrode, and the separator may also include elements other than a porous membrane (for example, an adhesive layer) so long as the effects disclosed herein are not significantly lost as a result.

<Electrolysis Solution>

The electrolysis solution is normally an organic electrolysis solution obtained by dissolving a supporting electrolyte in an organic solvent. The supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferred as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Examples of suitable organic solvents that can be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

Note that the concentration of the electrolyte in the electrolysis solution may be adjusted as appropriate. Moreover, known additives such as vinylene carbonate (VC) may be added to the electrolysis solution.

<Production of Lithium Ion Secondary Battery>

The presently disclosed lithium ion secondary battery can be produced, for example, by stacking the positive electrode and the negative electrode with the separator in-between, rolling or folding the resulting stack as necessary in accordance with the battery shape, placing the stack in a battery container, filling the battery container with the electrolysis solution, and sealing the battery container. In order to prevent pressure-increase inside the lithium ion secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the microstructure of a polymer A, the volume average particle diameter D50 and degree of swelling in electrolysis solution of polymers A and B, the transition metal capturing ability of a binding material, the rate of Gurley value increase, peel strength, and heat contraction resistance of a separator, and the high-temperature cycle characteristics and rate characteristics of a lithium ion secondary battery.

<Microstructure of Polymer A>

The microstructure of a polymer A (proportions of trans-1,4 bonding, cis-1,4 bonding, and vinyl bonding) was determined in accordance with the IR method of JIS K6239.

<Volume Average Particle Diameter D50 of Polymer A and Polymer B>

The volume average particle diameter D50 of each of a polymer A and a polymer B was determined to be a particle diameter at which, in a particle size distribution (volume basis) measured by a laser diffraction particle diameter distribution measurement device (SALD-7100 produced by Shimadzu Corporation) with respect to an aqueous dispersion of the polymer adjusted to a solid content concentration of 15 mass %, the cumulative volume calculated from a small diameter end of the distribution reached 50%.

<Degree of Swelling in Electrolysis Solution of Polymer A and Polymer B>

With respect to each of a polymer A and a polymer B, an aqueous dispersion of the polymer was cast in a polytetrafluoroethylene petri dish and was dried to obtain a cast film of 1 mm in thickness. The cast film was cut to 2 cm×2 cm in size to obtain a specimen. The weight of the specimen was measured and was taken to be W0. Thereafter, the specimen was immersed in an electrolysis solution having a temperature of 60° C. for 72 hours. The immersed specimen was pulled out of the electrolysis solution, was wiped with a paper towel, and the weight W1 thereof straight after immersion was measured. The degree of swelling in electrolysis solution of the polymer A or B was then determined by calculating W0/W0.

The electrolysis solution was obtained by dissolving $LiPF_6$ as a supporting electrolyte with a concentration of 1 mol/L in a mixed solvent obtained by mixing ethylene carbonate (EC) and diethyl carbonate (DEC) with an EC:DEC ratio of 1:2 (volume ratio at 20° C.).

<Transition Metal Capturing Ability of Binding Material>

An aqueous dispersion of a binding material (solid content concentration: 15 mass %) was poured into a Teflon® (Teflon is a registered trademark in Japan, other countries, or both) petri dish and was dried for 5 days at 25° C. The dried product was punched out to a size of 12 mm in diameter to obtain a film of 500 μm in thickness and 12 mm in diameter as a specimen. The weight of the specimen was measured. Next, 10 g of an electrolysis solution obtained by dissolving $LiPF_6$ as a supporting electrolyte in a solvent (ethyl methyl carbonate:ethylene carbonate=70:30 (mass ratio)) such as to have a concentration of 1 mol/L was poured into a glass container. The specimen was immersed therein and was left for 24 hours at 25° C. to allow sufficient swelling of the specimen in the electrolysis solution. A cobalt chloride ($CoCl_2$) solution was prepared by dissolving cobalt chloride (anhydrous) in an electrolysis solution of the same composition as the electrolysis solution described above such that the cobalt chloride solution had a cobalt concentration of 18 mass ppm (cobalt chloride concentration of 40 mass ppm). Next, 10 g of the cobalt chloride solution was added into the glass container in which the specimen was swollen in the previously described electrolysis solution, and the specimen was immersed in the cobalt chloride solution and was left for 5 days at 25° C. Thereafter, the specimen was removed from the cobalt chloride solution and was sufficiently washed with diethyl carbonate. The weight of the specimen was measured after sufficiently wiping off diethyl carbonate that was attached to the surface of the specimen. Next, the specimen was placed in a Teflon beaker, and sulfuric acid and nitric acid (sulfuric acid:nitric acid=0.1:2 (volume ratio)) were added thereto. The contents of the beaker were heated using a hot plate and were concentrated until carbonization of the specimen occurred. Nitric acid and perchloric acid (nitric acid:perchloric acid=2:0.2 (volume ratio)) were added to the beaker, followed by perchloric acid and hydrofluoric acid (perchloric acid:hydrofluoric acid=2:0.2 (volume ratio)), and the contents of the beaker were concentrated until white smoke was given off. Next, nitric acid and ultrapure water (nitric acid:ultrapure water=0.5:10 (volume ratio)) were added to the beaker and the contents thereof were heated. The contents of the beaker were left to cool and were then adjusted to a fixed volume to obtain a fixed volume solution. The amount of cobalt in the fixed volume solution was measured using an ICP mass spectrometer (ELAN DRS II produced by PerkinElmer Inc.). The amount of cobalt in the fixed volume solution was divided by the weight of the specimen to determine the cobalt concentration (mass ppm) in the specimen, and this cobalt concentration was taken to be the transition metal capturing ability. A higher cobalt concentration indicates that the binding material has a higher transition metal capturing ability per unit mass thereof.

<Rate of Gurley Value Increase of Separator>

A Gurley meter (Smooth & Porosity Meter (measurement diameter: Ø2.9 cm) produced by Kumagai Riki Kogyo Co., Ltd.) was used to measure a Gurley value (sec/100 cc) with respect to a produced separator (separator obtained by applying a composition for a porous membrane onto a separator substrate and drying the composition thereon; same applies hereinafter), and also with respect to a separator substrate onto which a composition for a porous membrane had not been applied. The Gurley value G0 for the separator substrate and the Gurley value G1 for the porous membrane-containing separator were used to determine a rate of Gurley value increase $\Delta G$ (={(G1−G0)/G0}×100%), which was evaluated by the following standard. A smaller rate of Gurley value increase $\Delta G$ indicates that the porous membrane-containing separator has better lithium ion permeability.

A: Rate of Gurley value increase $\Delta G$ of less than 15%

B: Rate of Gurley value increase $\Delta G$ of at least 15% and less than 25%

C: Rate of Gurley value increase $\Delta G$ of at least 25% and less than 35%

D: Rate of Gurley value increase $\Delta G$ of at least 35%

<Peel Strength of Separator>

A specimen was prepared by cutting out a rectangular shape of 10 mm in width by 100 mm in length from a produced separator and applying cellophane tape (prescribed by JIS Z1522) onto the surface at a porous membrane side of the separator. Next, the cellophane tape of the specimen was fixed to a test bed and, in this state, one end of the separator substrate was pulled in a vertical direction at a pulling rate of 10 mm/minute and the stress during peeling of the separator substrate was measured. This measurement was performed three times and an average value was determined. The average value was taken to be the peel strength and was evaluated by the following standard. A larger peel strength indicates a larger binding force between the porous membrane and the separator substrate, and thus indicates better close adherence.

A: Peel strength of at least 100 N/m
B: Peel strength of at least 75 N/m and less than 100 N/m
C: Peel strength of at least 50 N/m and less than 75 N/m
D: Peel strength of less than 50 N/m <Heat Contraction Resistance of Separator>

A specimen was prepared by cutting a square shape of 12 cm in width by 12 cm in length from a produced separator and drawing a square shape having a side length of 10 cm within the cut square shape. The specimen was left for 1 hour in a 130° C. thermostatic bath and the change in area of the square shape drawn within the specimen (={(area of square shape prior to being left−area of square shape after being left)/area of square shape prior to being left}×100%) was determined thereafter as a rate of heat contraction, which was evaluated by the following standard. A smaller rate of heat contraction indicates that the separator including the porous membrane has better heat contraction resistance.

A: Rate of heat contraction of less than 1%
B: Rate of heat contraction of at least 1% and less than 5%
C: Rate of heat contraction of at least 5% and less than 10%
D: Rate of heat contraction of at least 10%

<High-Temperature Cycle Characteristics of Lithium Ion Secondary Battery>

Five produced laminate cells having a discharge capacity of 45 mAh were subjected to a test (high-temperature cycle test) in which 200 cycles of charging to 4.35 V and discharging to 3 V were carried out by a 0.5 C constant-current method at an ambient temperature of 45° C. In the test, the discharge capacity C0 after 3 cycles of charging and discharging and the discharge capacity C1 after 200 cycles of charging and discharging (i.e., after completion of the high-temperature cycle test) were measured. An average value for the five cells was taken to be the measured value. The discharge capacity C1 after completion of 200 cycles was converted to a percentage relative to the discharge capacity C0 after completion of 3 cycles (=C1/C0×100%) to determine a discharge capacity retention rate $\Delta C$, which was evaluated by the following standard. A higher discharge capacity retention rate $\Delta C$ indicates better high-temperature cycle characteristics.

A: Discharge capacity retention rate $\Delta C$ of at least 85%
B: Discharge capacity retention rate $\Delta C$ of at least 80% and less than 85%
C: Discharge capacity retention rate $\Delta C$ of at least 75% and less than 80%
D: Discharge capacity retention rate $\Delta C$ of less than 75%

<Rate Characteristics of Lithium Ion Secondary Battery>

A produced laminate cell having a discharge capacity of 45 mAh was subjected to a charge/discharge cycle in which the laminate cell was charged to 4.35 V with a 0.2 C constant current and discharged to 3.0 V with a 0.2 C constant current at an ambient temperature of 25° C. and a charge/discharge cycle in which the laminate cell was charged to 4.35 V with a 0.2 C constant current and discharged to 3.0 V with a 1.0 C constant current at an ambient temperature of 25° C. The discharge capacity at 1.0 C was converted to a percentage relative to the discharge capacity at 0.2 C(=(discharge capacity at 1.0 C)/(discharge capacity at 0.2 C)×100%) to determine a rate of capacity change $\Delta C'$, which was evaluated by the following standard. A higher rate of capacity change $\Delta C'$ indicates better rate characteristics.

A: Rate of capacity change $\Delta C'$ of at least 85%
B: Rate of capacity change $\Delta C'$ of at least 80% and less than 85%
C: Rate of capacity change $\Delta C'$ of at least 75% and less than 80%
D: Rate of capacity change $\Delta C'$ of less than 75%

Example 1

<Production of Polymer A>

A 5 MPa pressure vessel equipped with a stirrer was charged with 100 parts of 1,3-butadiene as an aliphatic conjugated diene monomer, 3.0 parts of sodium dodecylbenzenesulfonate as an emulsifier, 100.0 parts of deionized water, and 0.25 parts of potassium persulfate as a polymerization initiator. The contents of the pressure vessel were sufficiently stirred and were then heated to 65° C. to initiate polymerization. Between the $6^{th}$ hour and the $16^{th}$ hour after initiation of polymerization, 0.1 parts of potassium persulfate, 2.0 parts of sodium dodecylbenzenesulfonate, and 50.0 parts of deionized water were added continuously. Thereafter, the reaction was terminated by cooling at the point at which monomer consumption reached 95.0% to yield an aqueous dispersion containing a polymer A in particulate form.

The microstructure, volume average particle diameter D50, and degree of swelling in electrolysis solution of the resultant polymer A were measured.

The results are shown in Table 1.

<Production of Polymer B>

A reaction vessel equipped with a stirrer was charged with 70 parts of deionized water, 0.15 parts of sodium lauryl sulfate (produced by Kao Corporation, product name: EMAL® 2F (EMAL is a registered trademark in Japan, other countries, or both)) as an emulsifier, and 0.5 parts of ammonium peroxodisulfate as a polymerization initiator. The gas phase of the reaction vessel was purged with nitrogen gas and the contents of the reaction vessel were heated to 60° C.

A monomer mixture was prepared in a separate vessel by mixing 50.0 parts of deionized water, 0.5 parts of sodium dodecylbenzenesulfonate as a dispersant, 93.8 parts of n-butyl acrylate as a (meth)acrylic acid ester monomer, 2.0 parts of methacrylic acid as an acid group-containing monomer, 1.2 parts of N-methylolacrylamide as a crosslinkable monomer, 2.0 parts of acrylonitrile as a nitrile group-containing monomer, and 1.0 parts of allyl glycidyl ether as a crosslinkable monomer. The monomer mixture was added continuously to the aforementioned reaction vessel over 4 hours while carrying out polymerization. The reaction was carried out at 60° C. during the addition. Once the addition was completed, stirring was carried out for a further 3 hours at 70° C. to complete the reaction and yield an aqueous dispersion containing a polymer B in particulate form.

The volume average particle diameter D50 and degree of swelling in electrolysis solution of the resultant polymer B were measured. The results are shown in Table 1. The resultant polymer B had a glass transition temperature of −45° C.

<Production of Binding Material>

The transition metal capturing ability of a binding material produced by mixing 10.0 parts by solid content equivalents of the polymer A and 5.0 parts by solid content equivalents of the polymer B was measured. The results are shown in Table 1.

<Production of Composition for Porous Membrane>

Water was added to 100 parts of barium sulfate (volume average particle diameter D50: 0.55 μm, specific surface area: 5.5 m$^2$/g) as non-conductive particles and 0.5 parts of a polycarboxylic acid ammonium salt as a dispersant such that the solid content concentration was 50 mass %, and the barium sulfate was dispersed using a media-less disperser. Thereafter, a polyacrylamide aqueous solution having a solid content concentration of 15 mass % (dissolved upon addition) was added and mixed as a viscosity modifier such that the solid content concentration was adjusted to 1.5 mass %. Next, 10.0 parts by solid content equivalents of the polymer A, 5.0 parts by solid content equivalents of the polymer B, and 0.2 parts of a wetting agent were added and water was mixed in to adjust the solid content concentration to 40 mass % and yield a composition for a porous membrane in slurry form.

<Production of Separator>

The composition for a porous membrane was applied onto a single-layered polyethylene separator substrate of 250 mm in width, 1,000 m in length, and 12 μm in thickness that had been produced by a wet method. The composition for a porous membrane was applied using a gravure coater at a speed of 20 m/minute such as to have a thickness after drying of 2.0 μm. The applied composition was then dried in a 50° C. drying furnace to produce a porous membrane-containing separator that was then wound up. The total content of the polymer A and the polymer B per unit area of the produced separator was 0.18 g/m$^2$ by solid content equivalents.

The rate of Gurley value increase, peel strength, and heat contraction resistance of the obtained separator were evaluated. The results are shown in Table 1.

<Production of Positive Electrode>

A slurry composition for a positive electrode was produced by mixing 100 parts of LiCoO$_2$ (volume average particle diameter D50: 12 μm) as a positive electrode active material, 2 parts of acetylene black (HS-100 produced by Denki Kagaku Kogyo Kabushiki Kaisha) as a conductive additive, and 2 parts by solid content equivalents of polyvinylidene fluoride (#7208 produced by Kureha Corporation) as a binding material for a positive electrode mixed material layer in N-methylpyrrolidone such that the total solid content concentration was 70%, and then performing further mixing using a planetary mixer.

A comma coater was used to apply the resultant slurry composition for a positive electrode onto aluminum foil of 20 μm in thickness, used as a current collector, such as to have a thickness of approximately 150 μm after drying. The slurry composition for a positive electrode was then dried to obtain a positive electrode web by conveying the aluminum foil inside of a 60° C. oven for 2 minutes at a speed of 0.5 m/minute. The resultant positive electrode web was subsequently rolled by roll pressing to obtain a positive electrode including a positive electrode mixed material layer of 95 μm in thickness.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium peroxodisulfate as a polymerization initiator. The contents of the pressure vessel were sufficiently stirred and were then heated to 50° C. to initiate polymerization. The reaction was terminated by cooling at the point at which the polymerization conversion rate reached 96% to yield a mixture that contained a binding material for a negative electrode mixed material layer (styrene-butadiene copolymer (SBR)). The mixture containing the binding material for a negative electrode mixed material layer was adjusted to pH 8 through addition of 5% sodium hydroxide aqueous solution and unreacted monomers were removed therefrom by heated vacuum distillation. Thereafter, the mixture was cooled to 30° C. or lower to obtain an aqueous dispersion containing the target binding material for a negative electrode mixed material layer.

Next, 100 parts of artificial graphite (volume average particle diameter D50: 15.6 μm) as a negative electrode active material, 1 part by solid content equivalents of a 2% aqueous solution of a sodium salt of carboxymethyl cellulose (MAC350HC produced by Nippon Paper Industries Co., Ltd.) as a thickener, and deionized water were mixed and, after the solid content concentration had been adjusted to 68%, mixing was carried out for 60 minutes at 25° C. The solid content concentration was then adjusted to 62% with deionized water and a further 15 minutes of mixing was carried out at 25° C. Next, 1.5 parts by solid content equivalents of the binding material for a negative electrode mixed material layer (SBR) and deionized water were added to the mixed liquid described above and, after the final solid content concentration had been adjusted to 52%, mixing was carried out for a further 10 minutes. The resultant mixture was subjected to a defoaming process under reduced pressure to yield a slurry composition for a negative electrode having good fluidity.

A comma coater was used to apply the resultant slurry composition for a negative electrode onto copper foil of 20 μm in thickness, used as a current collector, such as to have a thickness of approximately 150 μm after drying. The slurry composition for a negative electrode was then dried to obtain a negative electrode web by conveying the copper foil inside of a 60° C. oven for 2 minutes at a speed of 0.5 m/minute. The resultant negative electrode web was subsequently rolled by roll pressing to obtain a negative electrode including a negative electrode mixed material layer of 100 μm in thickness.

<Production of Lithium Ion Secondary Battery>

An aluminum packing case was prepared as a battery case. The positive electrode obtained as described above was cut out to an overall size of 4.3 cm×3.8 cm such that a portion of the current collector coated with the positive electrode mixed material layer was 2.8 cm×3.8 cm in size and a portion of the current collector not coated with the positive electrode mixed material layer was 1.5 cm×3.8 cm in size. The cut-out positive electrode was positioned with a surface at the current collector side thereof in contact with the aluminum packing case. The separator obtained as described above was cut out to 3.5 cm×4.5 cm in size and was positioned on the surface of the positive electrode mixed material layer such that the porous membrane of the separator faced toward the positive electrode. The negative electrode obtained after pressing as described above was cut out to an overall size of 4.5 cm×4.0 cm such that a portion of the current collector coated with the negative electrode mixed material layer was 3.0 cm×4.0 cm in size and a portion of the current collector not coated with the negative electrode mixed material layer was 1.5 cm×4.0 cm in size. The cut-out negative electrode was positioned on the separator such that a surface at the negative electrode mixed material layer side thereof faced toward the separator. The aluminum packing case was filled with an electrolysis solution (solvent: ethylene carbonate (EC)/ethyl methyl carbonate (EMC)/vinylene carbonate (VC)=68.5/30/1.5 (volume ratio), supporting electrolyte: LiPF$_6$ of 1M in concentration) such that no air remained. The aluminum packing case was then closed by heat sealing at 150° C. to tightly seal an opening of the aluminum packing. In this manner, a lithium ion secondary battery was produced in the form of a laminate cell having a discharge capacity of 45 mAh.

The high-temperature cycle characteristics and rate characteristics of the obtained lithium ion secondary battery were measured and evaluated. The results are shown in Table 1.

Example 2

A binding material, a composition for a porous membrane, a separator, a positive electrode, a negative electrode, and a lithium ion secondary battery were produced in the same way as in Example 1 with the exception that in production of the binding material and production of the composition for a porous membrane, the amount (by solid content equivalents) of the polymer A was changed to 8.0 parts and the amount (by solid content equivalents) of the polymer B was changed to 7.0 parts. Each evaluation was performed in the same way as in Example 1. The results are shown in Table 1.

Example 3

A binding material, a composition for a porous membrane, a separator, a positive electrode, a negative electrode, and a lithium ion secondary battery were produced in the same way as in Example 1 with the exception that in production of the binding material and production of the composition for a porous membrane, the amount (by solid content equivalents) of the polymer A was changed to 12.5 parts and the amount (by solid content equivalents) of the polymer B was changed to 2.5 parts. Each evaluation was performed in the same way as in Example 1. The results are shown in Table 1.

Example 4

A binding material, a composition for a porous membrane, a separator, a positive electrode, a negative electrode, and a lithium ion secondary battery were produced in the same way as in Example 1 with the exception that in production of the binding material and production of the composition for a porous membrane, the amount (by solid content equivalents) of the polymer A was changed to 20.0 parts and the amount (by solid content equivalents) of the polymer B was changed to 2.5 parts. Each evaluation was performed in the same way as in Example 1. The results are shown in Table 1.

Example 5

A binding material, a composition for a porous membrane, a separator, a positive electrode, a negative electrode, and a lithium ion secondary battery were produced in the same way as in Example 1 with the exception that in production of the binding material and production of the composition for a porous membrane, the amount (by solid content equivalents) of the polymer A was changed to 3.0 parts and the amount (by solid content equivalents) of the polymer B was changed to 7.0 parts. Each evaluation was performed in the same way as in Example 1. The results are shown in Table 1.

Example 6

A binding material, a composition for a porous membrane, a separator, a positive electrode, a negative electrode, and a lithium ion secondary battery were produced in the same way as in Example 1 with the exception that in production of the binding material and production of the composition for a porous membrane, the amount (by solid content equivalents) of the polymer A was changed to 2.0 parts and the amount (by solid content equivalents) of the polymer B was changed to 1.0 parts. Each evaluation was performed in the same way as in Example 1. The results are shown in Table 1.

Example 7

A binding material, a composition for a porous membrane, a separator, a positive electrode, a negative electrode, and a lithium ion secondary battery were produced in the same way as in Example 1 with the exception that in production of the polymer B, the amount of n-butyl acrylate was changed to 85.8 parts and the amount of acrylonitrile was changed to 10.0 parts. Each evaluation was performed in the same way as in Example 1. The results are shown in Table 1.

Example 8

A binding material, a composition for a porous membrane, a separator, a positive electrode, a negative electrode, and a lithium ion secondary battery were produced in the same way as in Example 1 with the exception that in production of the polymer A, the amount of 1,3-butadiene was changed to 98 parts and 2 parts of methacrylic acid was added as an acid group-containing monomer. Each evaluation was performed in the same way as in Example 1. The results are shown in Table 1.

Comparative Example 1

A binding material, a composition for a porous membrane, a separator, a positive electrode, a negative electrode, and a lithium ion secondary battery were produced in the same way as in Example 1 with the exception that in production of the binding material and production of the composition for a porous membrane, the amount of the polymer A was changed to 15.0 parts and the amount of the polymer B was changed to 0 parts. Each evaluation was performed in the same way as in Example 1. The results are shown in Table 1.

Comparative Example 2

A binding material, a composition for a porous membrane, a separator, a positive electrode, a negative electrode, and a lithium ion secondary battery were produced in the same way as in Example 1 with the exception that in production of the binding material and production of the composition for a porous membrane, the amount of the polymer A was changed to 0 parts and the amount of the polymer B was changed to 15.0 parts. Each evaluation was performed in the same way as in Example 1. The results are shown in Table 1.

Comparative Example 3

A binding material, a composition for a porous membrane, a separator, a positive electrode, a negative electrode, and a lithium ion secondary battery were produced in the same way as in Example 1 with the exception that in production of the binding material and production of the composition for a porous membrane, the amount of the polymer A was changed to 13.6 parts and the amount of the polymer B was changed to 1.4 parts. Each evaluation was performed in the same way as in Example 1. The results are shown in Table 1.

Comparative Example 4

A binding material, a composition for a porous membrane, a separator, a positive electrode, a negative electrode, and a lithium ion secondary battery were produced in the same way as in Example 1 with the exception that in production of the polymer B, the amount of n-butyl acrylate was changed to 52.8 parts, the amount of acrylonitrile was changed to 0 parts, and the amount of styrene was changed to 43.0 parts. Each evaluation was performed in the same way as in Example 1. The results are shown in Table 1.

TABLE 1

| | | | | Example 1 | Example 2 | Example 3 | Example 4 | Example 5 | Example 6 |
|---|---|---|---|---|---|---|---|---|---|
| Composition for porous membrane | Non-conductive particles | | Type | Barium sulfate | Barium sulfate | Barium sulfate | Barium sulfate | Barium sulfate | Barium sulfate |
| | | | Amount [parts by mass] | 100 | 100 | 100 | 100 | 100 | 100 |
| | Polymer A | Composition | 1,3-Butadiene [mass %] | 100 | 100 | 100 | 100 | 100 | 100 |
| | | | Methacrylic acid [mass %] | — | — | — | — | — | — |
| | | | Proportion of trans-1,4 bonding in 1,3-butadiene units [mol %] | 59 | 59 | 59 | 59 | 59 | 59 |
| | | | Proportion of cis-1,4 bonding in 1,3-butadiene units [mol %] | 23 | 23 | 23 | 23 | 23 | 23 |
| | | | Proportion of 1,2 bonding in 1,3-butadiene units [mol %] | 18 | 18 | 18 | 18 | 18 | 18 |
| | | | Volume average particle diameter D50 [nm] | 120 | 120 | 120 | 120 | 120 | 120 |
| | | | Degree of swelling in electrolysis solution [factor] | 2.2 | 2.2 | 2.2 | 2.2 | 2.2 | 2.2 |
| | | | Amount [parts by mass] | 10.0 | 8.0 | 12.5 | 20.0 | 3.0 | 2.0 |
| | Polymer B | Composition | n-Butyl acrylate [mass %] | 93.8 | 93.8 | 93.8 | 93.8 | 93.8 | 93.8 |
| | | | N-Methylolacrylamide [mass %] | 1.2 | 1.2 | 1.2 | 1.2 | 1.2 | 1.2 |
| | | | Allyl glycidyl ether [mass %] | 1.0 | 1.0 | 1.0 | 1.0 | 1.0 | 1.0 |
| | | | Methacrylic acid [mass %] | 2.0 | 2.0 | 2.0 | 2.0 | 2.0 | 2.0 |
| | | | Acrylonitrile [mass %] | 2.0 | 2.0 | 2.0 | 2.0 | 2.0 | 2.0 |
| | | | Styrene [mass %] | — | — | — | — | — | — |
| | | | Volume average particle diameter D50 [nm] | 370 | 370 | 370 | 370 | 370 | 370 |
| | | | Degree of swelling in electrolysis solution [factor] | 3.7 | 3.7 | 3.7 | 3.7 | 3.7 | 3.7 |
| | | | Amount [parts by mass] | 5.0 | 7.0 | 2.5 | 2.5 | 7.0 | 1.0 |
| | | | Ratio of amount of polymer A relative to amount of polymer B (mass basis) | 2.0 | 1.1 | 5.0 | 8.0 | 0.43 | 2.0 |
| | | | Total amount of polymer A and polymer B [parts by mass] | 15.0 | 15.0 | 15.0 | 22.5 | 10.0 | 3.0 |
| Evaluation | Binding material | | Transition metal capturing ability [mass ppm] | 633 | 694 | 610 | 587 | 569 | 633 |
| | Separator | | Rate of Gurley value increase | A | A | A | B | A | A |
| | | | Peel strength | A | A | A | C | A | C |
| | | | Heat contraction resistance | A | A | A | B | A | A |
| | Lithium ion secondary battery | | High-temperature cycle characteristics | A | A | A | A | B | B |
| | | | Rate characteristics | A | A | A | B | A | A |

| | | | | Example 7 | Example 8 | Comparative Example 1 | Comparative Example 2 | Comparative Example 3 | Comparative Example 4 |
|---|---|---|---|---|---|---|---|---|---|
| Composition for porous membrane | Non-conductive particles | | Type | Barium sulfate | Barium sulfate | Barium sulfate | — | Barium sulfate | Barium sulfate |
| | | | Amount [parts by mass] | 100 | 100 | 100 | — | 100 | 100 |
| | Polymer A | Composition | 1,3-Butadiene [mass %] | 100 | 98 | 100 | — | 100 | 100 |
| | | | Methacrylic acid [mass %] | — | 2 | — | — | — | — |
| | | | Proportion of trans-1,4 bonding in 1,3-butadiene units [mol %] | 59 | 60 | 59 | — | 59 | 59 |
| | | | Proportion of cis-1,4 bonding in 1,3-butadiene units [mol %] | 23 | 24 | 23 | — | 23 | 23 |
| | | | Proportion of 1,2 bonding in 1,3-butadiene units [mol %] | 18 | 16 | 18 | — | 18 | 18 |
| | | | Volume average particle diameter D50 [nm] | 120 | 120 | 120 | — | 120 | 120 |
| | | | Degree of swelling in electrolysis solution [factor] | 2.2 | 2.0 | 2.2 | — | 2.2 | 2.2 |
| | | | Amount [parts by mass] | 10.0 | 10.0 | 15.0 | 0 | 13.6 | 10.0 |
| | Polymer B | Composition | n-Butyl acrylate [mass %] | 85.8 | 93.8 | — | 93.8 | 93.8 | 52.8 |
| | | | N-Methylolacrylamide [mass %] | 1.2 | 1.2 | — | 1.2 | 1.2 | 1.2 |
| | | | Allyl glycidyl ether [mass %] | 1.0 | 1.0 | — | 1.0 | 1.0 | 1.0 |
| | | | Methacrylic acid [mass %] | 2.0 | 2.0 | — | 2.0 | 2.0 | 2.0 |
| | | | Acrylonitrile [mass %] | 10.0 | 2.0 | — | 2.0 | 2.0 | — |
| | | | Styrene [mass %] | — | — | — | — | — | 43.0 |
| | | | Volume average particle diameter D50 [nm] | 350 | 370 | — | 370 | 370 | 150 |
| | | | Degree of swelling in electrolysis solution [factor] | 5.2 | 3.7 | — | 3.7 | 3.7 | 2.8 |

TABLE 1-continued

| | | | | | | | | |
|---|---|---|---|---|---|---|---|---|
| | | Amount [parts by mass] | 5.0 | 5.0 | 0 | 15.0 | 1.4 | 5.0 |
| | | Ratio of amount of polymer A relative to amount of polymer B (mass basis) | 2.0 | 2.0 | — | 0.0 | 9.7 | 2.0 |
| | | Total amount of polymer A and polymer B [parts by mass] | 15.0 | 15.0 | 15.0 | 15.0 | 15.0 | 15.0 |
| Evaluation | Binding material | Transition metal capturing ability [mass ppm] | 746 | 696 | 497 | 303 | 565 | 520 |
| | Separator | Rate of Gurley value increase | A | A | A | C | A | A |
| | | Peel strength | B | A | D | A | D | D |
| | | Heat contraction resistance | A | A | A | B | B | A |
| | Lithium ion secondary battery | High-temperature cycle characteristics | A | A | B | C | B | B |
| | | Rate characteristics | B | A | A | C | A | B |

It can be seen from Table 1 that in each of Examples 1-8, in which a polymer A including an aliphatic conjugated diene monomer unit in a proportion of greater than 85 mass % and a polymer B including a (meth)acrylic acid ester monomer unit in a proportion of at least 60 mass % were contained in a mass basis ratio of content of the polymer A relative to content of the polymer B of at least 0.2 and no greater than 9.0, a binding material having excellent transition metal capturing ability, a separator having excellent lithium ion permeability, peel strength, and heat contraction resistance, and a lithium ion secondary battery having excellent high-temperature cycle characteristics and rate characteristics were obtained.

On the other hand, it can also be seen from Table 1 that a separator having excellent peel strength was not obtained in Comparative Example 1 in which the polymer B was not added, Comparative Example 3 in which the ratio of the content of the polymer A relative to the content of the polymer B was greater than 9.0, and Comparative Example 4 in which the content of the (meth)acrylic acid ester monomer unit in the polymer B was less than 60 mass %.

Moreover, it can be seen from Table 1 that a binding material having excellent transition metal capturing ability was not obtained and a lithium ion secondary battery having excellent high-temperature cycle characteristics and rate characteristics was not obtained in Comparative Example 2 in which the polymer A was not added.

Furthermore, Examples 1-6 in Table 1 demonstrate that through adjustment of the blending ratio and amounts of the polymer A and the polymer B, a balance of high levels of transition metal capturing ability per unit mass of a binding material and transition metal capturing ability of a porous membrane as a whole, and also of ion permeability, peel strength, and heat contraction resistance of a separator can be achieved, and a lithium ion secondary battery having excellent high-temperature cycle characteristics and rate characteristics can be obtained. Note that the transition metal capturing ability of the porous membrane as a whole is a parameter that is influenced by both the transition metal capturing ability per unit mass of the binding material and the amount of the binding material.

INDUSTRIAL APPLICABILITY

According to the present disclosure, it is possible to obtain a composition for a lithium ion secondary battery porous membrane capable of forming a porous membrane having excellent capturing ability with respect to transition metal ions, such as cobalt ions, that elute into an electrolysis solution from a positive electrode active material, while also ensuring performance in terms of peel strength and so forth.

Moreover, according to the present disclosure, it is possible to obtain a porous membrane for a lithium ion secondary battery having excellent capturing ability with respect to transition metal ions, such as cobalt ions, that elute into an electrolysis solution from a positive electrode active material, and excellent performance in terms of peel strength and the like.

Furthermore, according to the present disclosure, it is possible to obtain a lithium ion secondary battery having excellent life characteristics, such as cycle characteristics.

The invention claimed is:

1. A composition for a lithium ion secondary battery porous membrane comprising
non-conductive particles and a binding material, wherein
the binding material includes a polymer A including an aliphatic conjugated diene monomer unit in a proportion of greater than 85 mass % and a polymer B including a (meth)acrylic acid ester monomer unit in a proportion of at least 60 mass %, and
a ratio of content of the polymer A in the composition relative to content of the polymer B in the composition is at least 0.2 and no greater than 9.0.

2. The composition for a lithium ion secondary battery porous membrane of claim 1, wherein
the polymer A and the polymer B are contained in a total amount of at least 2 parts by mass and no greater than 50 parts by mass per 100 parts by mass of the non-conductive particles.

3. The composition for a lithium ion secondary battery porous membrane of claim 1, wherein
the polymer B has a degree of swelling in electrolysis solution of at least a factor of 2.5 and no greater than a factor of 6.0.

4. A porous membrane for a lithium ion secondary battery formed using the composition for a lithium ion secondary battery porous membrane of claim 1.

5. A lithium ion secondary battery comprising:
a positive electrode mixed material layer containing a transition metal-containing positive electrode active material; and
the porous membrane for a lithium ion secondary battery of claim 4.

* * * * *